(12) United States Patent
Kennedy et al.

(10) Patent No.: US 8,674,034 B2
(45) Date of Patent: Mar. 18, 2014

(54) POLYISOBUTYLENE-BASED POLYURETHANES, POLYUREAS AND/OR POLYURETHANE-POLYUREAS AND METHOD FOR MAKING SAME

(75) Inventors: Joseph P. Kennedy, Akron, OH (US); Gabor Erdodi, Stow, OH (US); Jungmee Kang, Stow, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 13/515,131

(22) PCT Filed: Nov. 11, 2010

(86) PCT No.: PCT/US2010/056371
§ 371 (c)(1),
(2), (4) Date: Jun. 11, 2012

(87) PCT Pub. No.: WO2011/060161
PCT Pub. Date: May 19, 2011

(65) Prior Publication Data
US 2012/0259069 A1    Oct. 11, 2012

Related U.S. Application Data

(60) Provisional application No. 61/260,051, filed on Nov. 11, 2009, provisional application No. 61/312,767, filed on Mar. 11, 2010.

(51) Int. Cl.
| | |
|---|---|
| *C08G 18/67* | (2006.01) |
| *C08G 18/10* | (2006.01) |
| *C08G 18/32* | (2006.01) |
| *C08G 18/65* | (2006.01) |
| *C08G 18/76* | (2006.01) |

(52) U.S. Cl.
USPC .......................................................... 525/460

(58) Field of Classification Search
USPC .......................................................... 525/460
See application file for complete search history.

(56) References Cited

FOREIGN PATENT DOCUMENTS

WO    WO 2010081132 A1 *    7/2010

OTHER PUBLICATIONS

Kang et al. ("PIB-Based Polyurethanes. IV. Morphology of the Polyurethane Containing Soft Co-Segments", J Polymer Science Part A: Polymer Chemistry, 47, 6180-6190(2009); Published Online Oct. 8, 2009).*
Erdodi et al. ("Polyisobutylene-Based Polyurethanes. III. Polyurethanes Containing PIB/PTMO Soft Cosegments", J Polymer Science Part A: Polymer Chemistry, 47, 5278-5290(2009); Published Online Sep. 10, 2009).*

* cited by examiner

*Primary Examiner* — Randy Gulakowski
*Assistant Examiner* — Christopher M Rodd
(74) *Attorney, Agent, or Firm* — Renner Kenner Greive Bobak Taylor & Weber

(57) ABSTRACT

The present invention generally relates to polyisobutylene-based polyurethanes, polyureas and/or polyurethane-polyureas, and to a process for making such compounds. In one embodiment, the polyisobutylene-based polyurethanes, polyureas and/or polyurethane-polyureas also include at least one flexible hydrogen bond acceptor chain extender (HACE). In another embodiment, amine telechelic and hydroxyl telechelic polyisobutylenes are utilized with at least one at least one flexible hydrogen bond acceptor chain extender (HACE) to produce polyurethane-polyureas having various desired mechanical properties in combination with various desired oxidative/hydrolytic stability.

11 Claims, 10 Drawing Sheets

US 8,674,034 B2

POLYISOBUTYLENE-BASED POLYURETHANES, POLYUREAS AND/OR POLYURETHANE-POLYUREAS AND METHOD FOR MAKING SAME

RELATED APPLICATION DATA

This patent application claims priority to U.S. Provisional Patent Application No. 61/260,051, filed on Nov. 11, 2009, entitled "Oxidatively/Hydrolytically Stable Polyurethanes;" and U.S. Provisional Patent Application No. 61/312,767, filed Mar. 11, 2010, entitled "Mechanical Properties and Oxidative/Hydrolytic Stability by H-Bond Acceptor Chain Extenders;" the entireties of which are hereby incorporated by reference herein.

FIELD OF THE INVENTION

The present invention generally relates to polyisobutylene-based polyurethanes, polyureas and/or polyurethane-polyureas, and to a process for making such compounds. In one embodiment, the polyisobutylene-based polyurethanes, polyureas and/or polyurethane-polyureas also include at least one flexible hydrogen bond acceptor chain extender (HACE). In another embodiment, amine telechelic and hydroxyl telechelic polyisobutylenes are utilized with at least one at least one flexible hydrogen bond acceptor chain extender (HACE) to produce polyurethane-polyureas having various desired mechanical properties in combination with various desired oxidative/hydrolytic stability.

BACKGROUND OF THE INVENTION

Polyurethanes (PUs) are excellent engineering materials but have poor oxidative/hydrolytic stability, while polyisobutylenes (PIBs) are excellent soft rubbers with outstanding oxidative/hydrolytic stability.

PUs containing exclusively PIB soft segments have been prepared previously. Early research was driven by the expectations that: (1) phase separation between the hard and soft phases would be excellent because of the incompatibility between the polar urethane hard segments and nonpolar PIB soft segments; and (2) the oxidative/hydrolytic stability of the products would be outstanding because of the saturated PIB segments.

PIB is used in numerous commodities, such as automotive inner tubes, wire insulators, etc., where oxidative/hydrolytic and chemical stability are required. While the oxidative/hydrolytic stability of these early PIB-based PUs was indeed outstanding, their mechanical properties were moderate to low because of the lack of hydrogen bonding between the hard and soft segments, and excessive incompatibility between the polar hard- and nonpolar soft segments.

Thus, there is a need in the art for polyisobutylene-based polyurethanes, polyureas and/or polyurethane-polyureas compounds that possess various desired mechanical properties in combination with various desired oxidative/hydrolytic stability

SUMMARY OF THE INVENTION

The present invention generally relates to polyisobutylene-based polyurethanes, polyureas and/or polyurethane-polyureas, and to a process for making such compounds. In one embodiment, the polyisobutylene-based polyurethanes, polyureas and/or polyurethane-polyureas also include at least one flexible hydrogen bond acceptor chain extender (HACE). In another embodiment, amine telechelic and hydroxyl telechelic polyisobutylenes are utilized with at least one at least one flexible hydrogen bond acceptor chain extender (HACE) to produce polyurethane-polyureas having various desired mechanical properties in combination with various desired oxidative/hydrolytic stability.

In one embodiment, the present invention relates to a PIB-based polymer composition comprising: (a) from about 50 weight percent to about 75 weight percent of one or more soft segments; (b) from about 15 weight percent to about 40 weight percent of one or more hard segments; and (c) from about 2 weight percent to about 30 weight percent of one or more hydrogen bond acceptor chain extender (HACE) segments.

In another embodiment, the present invention relates to a PIB-based polymer composition comprising: (i) from about 55 weight percent to about 75 weight percent of one or more soft segments; (ii) from about 15 weight percent to about 40 weight percent of one or more hard segments; and (iii) from about 2 weight percent to about 30 weight percent of one or more hydrogen bond acceptor chain extender (HACE) segments.

In still another embodiment, the present invention relates to a method of making a PIB-based polymer composition, the method comprising the steps of: (I) combining one or more amine telechelic PIBs, one or more hydroxyl telechelic PIBs, or a combination thereof with one or more diisocyanates to yield a mixture; (II) adding at least one catalyst to the mixture formed in Step (I) and reacting the mixture with the catalyst to yield a prepolymer; (III) adding one or more chain extenders and one or more hydrogen bond acceptor chain extender (HACE) compounds to the prepolymer; (IV) reacting the mixture of the prepolymer, the one or more chain extenders and the one or more hydrogen bond acceptor chain extender (HACE) compounds to yield a PIB-based polymer; and (V) collecting the PIB-based polymer.

In still yet another embodiment, the present invention relates to a PIB-based polymer composition that contains one or more HACE segments derived from one or more HACE compounds as shown and described herein.

In still yet another embodiment, the present invention relates to a method of making a PIB-based polymer composition that contains one or more HACE segments derived from one or more HACE compounds as shown and described herein.

DETAILED DESCRIPTION OF THE INVENTION

Figure 1:
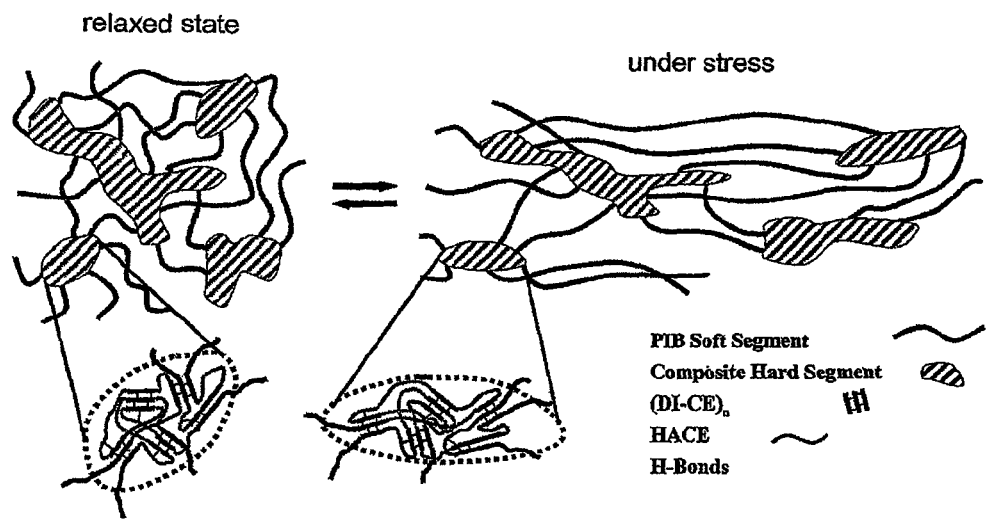
FIG. 1 is an illustration showing one idealized micro-morphology of PIB-based HACE-reinforced PUs in accordance with one embodiment of the present invention in the relaxed and stressed states.

The present invention generally relates to polyisobutylene-based polyurethanes, polyureas and/or polyurethane-polyureas, and to a process for making such compounds. In one embodiment, the polyisobutylene-based polyurethanes, polyureas and/or polyurethane-polyureas also include at least one flexible hydrogen bond acceptor chain extender (HACE). In another embodiment, amine telechelic and hydroxyl telechelic polyisobutylenes are utilized with at least one at least one flexible hydrogen bond acceptor chain extender (HACE) to produce polyurethane-polyureas having various desired mechanical properties in combination with various desired oxidative/hydrolytic stability.

In various embodiments detailed below, although the total amount of each component of the polymer compounds of the present invention may individually total more than 100 weight percent when each component is taken individually and totaled using the broadest amounts disclosed herein, one of skill in the art will realize that this is not the case for a specific embodiment.

In one embodiment, the present invention relates to PUs that exhibit a combination of desired mechanical properties together with desired oxidative/hydrolytic stability. In one instance, this is accomplished via the utilization of PIB soft segments in the PUs. Laboratory testing revealed that PUs containing about 70 weight percent PIB soft segments are extremely oxidatively stable (almost 100 percent retention of their mechanical properties after exposure to 35% HNO$_3$ was observed). On the other hand, PUs containing 50 weight percent PIB soft segments are much less stable under the same conditions. While not wishing to be bound to any one theory, it is believed that the presence of a high amount of PIB soft segments (in one embodiment about 70 weight percent) acts to protect the vulnerable urethane hard segments from oxidative/hydrolytic degradation. Furthermore, in some instances it is believed that continuous PIB soft segments can be more desirable and/or advantageous.

Thus, given the above, in one embodiment the present invention is a polyurethane polymer compound that is composed of: (a) from about 50 weight percent to about 75 weight percent of one or more soft segments (e.g., PIB soft segments); (b) from about 15 weight percent to about 40 weight percent of one or more hard segments (e.g., PU hard segments); and (c) from about 2 weight percent to about 30 weight percent of one or more hydrogen bond acceptor chain extender (HACE) segments.

In another embodiment, the present invention is a polyurethane polymer compound that is composed of from about 55 weight percent to about 72.5 weight percent of one or more soft segments (e.g., PIB soft segments), or from about 57.5 weight percent to about 70 weight percent of one or more soft segments (e.g., PIB soft segments), or from about 60 weight percent to about 67.5 weight percent of one or more soft segments (e.g., PIB soft segments), or even from about 62.5 weight percent to about 65 weight percent of one or more soft segments (e.g., PIB soft segments). In another embodiment, the present invention is a polyurethane polymer compound that is composed of from about 17.5 weight percent to about 37.5 weight percent of one or more hard segments (e.g., PU hard segments), or from about 20 weight percent to about 35 weight percent of one or more hard segments (e.g., PU hard segments), or from about 22.5 weight percent to about 32.5 weight percent of one or more hard segments (e.g., PU hard segments), or from about 25 weight percent to about 30 weight percent of one or more hard segments (e.g., PU hard segments), or even from about 24 weight percent to about 26 weight percent of one or more hard segments (e.g., PU hard segments). In another embodiment, the present invention is a polyurethane polymer compound that is composed of from about 5 weight percent to about 27.5 weight percent of one or more hydrogen bond acceptor chain extender (HACE) segments, or from about 7.5 weight percent to about 25 weight percent of one or more hydrogen bond acceptor chain extender (HACE) segments, or from about 10 weight percent to about 22.5 weight percent of one or more hydrogen bond acceptor chain extender (HACE) segments, or from about 12.5 weight percent to about 20 weight percent of one or more hydrogen bond acceptor chain extender (HACE) segments, or even from about 15 weight percent to about 17.5 weight percent of one or more hydrogen bond acceptor chain extender (HACE) segments. Here, as well as elsewhere in the specification and claims, individual numerical values, or limits, can be combined to form additional non-disclosed and/or non-stated ranges. In still another embodiment, the polyurethane compounds of the present invention have soft segments that are formed solely from one or more PIBs.

In another embodiment the present invention is a polyurethane polymer compound that is composed of: (a) from about 55 weight percent to about 75 weight percent of one or more soft segments (e.g., PIB soft segments); (b) from about 15 weight percent to about 40 weight percent of one or more hard segments (e.g., PU hard segments); and (c) from about 2 weight percent to about 30 weight percent of one or more hydrogen bond acceptor chain extender (HACE) segments. In still another embodiment, the polyurethane compounds of the present invention have soft segments that are formed solely from one or more PIBs and hard segments that are PU hard segments.

Regarding the PIB materials utilized in conjunction with the present invention suitable PIB materials are either amine telechelic or hydroxyl telechelic PIBs (i.e., H$_2$N-PIB-NH$_2$ or HO-PIB-OH) having a suitable number of PIB repeating units in the range of about 2 to about 5,000, or from about 7 to about 4,500, or from about 10 to about 4,000, or from about 15 to about 3,500, or from about 25 to about 3,000, or from about 75 to about 2,500, or from about 100 to about 2,000, or from about 250 to about 1,500, or even from about 500 to about 1,000. Here, as well as elsewhere in the specification and claims, individual numerical values, or limits, can be combined to form additional non-disclosed and/or non-stated ranges. Various methods for producing the amine telechelic or hydroxyl telechelic PIBs materials are known in the art. For example, suitable methods are discussed in PCT Patent Application Nos. WO 2008/066914 and WO 2010/039986, the entireties of which are incorporated herein by reference.

Other suitable synthesis methods are known to those of skill in the art and as such a discussion herein is omitted for the sake of brevity.

In one embodiment, when the hard segment portion of the present invention is formed from PUs, the materials utilized to form the polyurethane (PU) hard segments are selected from one or more suitable diisocyanates (DIs) and one or more suitable chain extenders (CEs). In one embodiment, the DIs and CEs that are suitable for producing polyurethanes (PUs) include, but are not limited to, commonly utilized DIs and CEs for the production of polyurethanes that are known to those of skill in the art. In another embodiment, the DIs utilized in conjunction with the present invention are selected from 4,4'-methylene diphenyl diisocyanate (MDI) and/or 4,4'-methylene dicyclohexyl diisocyanate (HMDI), and the CEs from one or more of 1,4-butane diol (BDO), 1,6-hexane diol (HDO) and/or 1,6-hexane diamine (HDA). The structures for these compounds are shown below:

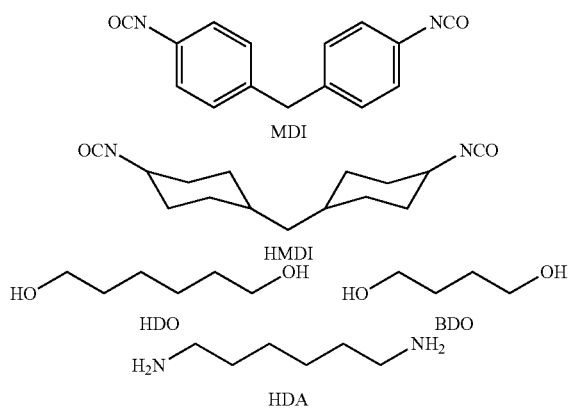

As used herein, the term "hydrogen bond acceptor chain extender" (HACE) is defined to mean any chain extender that has suitable groups that are able to accept hydrogen bonds. In one embodiment, suitable compounds that fall within the scope of this definition include, but are not limited to, those compounds that possess hydrogen bond accepting groups selected from —O—, —CO—, —OC(O)O—, —N(CH$_3$)—, and —S—. In another embodiment, the one or more hydrogen bond acceptor chain extenders that are utilized to form the one or more hydrogen bond acceptor chain extender segments of the compounds of the present invention are selected from various combinations of one or more esters, carbonates, ketones, and/or amines. In still another embodiment, any one or more compound that meets either of the above criteria and has a molecular weight of about 100 grams per mole to about 1,250 grams per mole, or from about 125 grams per mole to about 1,000 grams per mole, or from about 150 grams per mole to about 900 grams per mole, or from about 200 grams per mole to about 750 grams per mole, or from about 200 grams per mole to about 650 grams per mole, or even from abut 250 grams per mole to about 500 grams per mole. In another embodiment, any one or more compounds that meet either of the above criteria and have a molecular weight of about 150 grams per mole to about 650 grams per mole. Here, as well as elsewhere in the specification and claims, individual numerical values, or limits, can be combined to form additional non-disclosed and/or non-stated ranges.

In still yet another embodiment, one or more compounds according to the following structures can be utilized as hydrogen bond acceptor chain extenders of the present invention:

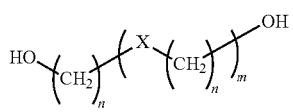

where n is equal to an integer in the range of 1 to 6, m is equal to an integer in the range of 1 to 10, and where X is selected from:

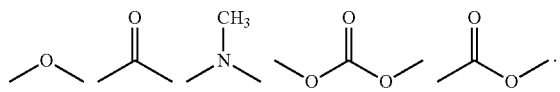

In still yet another embodiment, n is equal to an integer in the range of 2 to 4 and m is equal to an integer in the range of 2 to 8. Here, as well as elsewhere in the specification and claims, individual numerical values, or limits, can be combined to form additional non-disclosed and/or non-stated ranges.

In still yet another embodiment, one or more compounds according to the following structures can be utilized as hydrogen bond acceptor chain extenders of the present invention:

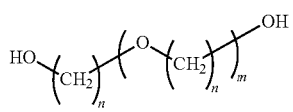

where n is equal to an integer in the range of 1 to 6, m is equal to an integer in the range of 1 to 10. In still another embodiment, n is equal to an integer in the range of 1 to 4 and m is equal to an integer in the range of 2 to 8. Here, as well as elsewhere in the specification and claims, individual numerical values, or limits, can be combined to form additional non-disclosed and/or non-stated ranges.

In still yet another embodiment, the one or more hydrogen bond acceptor chain extenders of the present invention are selected from compounds that have at least two terminal —OH groups and have a molecular weight of about 100 grams per mole to about 1,250 grams per mole, or from about 125 grams per mole to about 1,000 grams per mole, or from about 150 grams per mole to about 900 grams per mole, or from about 200 grams per mole to about 750 grams per mole, or from about 200 grams per mole to about 650 grams per mole, or even from abut 250 grams per mole to about 500 grams per mole. In another embodiment, any one or more compound that have at least two terminal —OH groups and have a molecular weight of about 150 grams per mole to about 650 grams per mole. Here, as well as elsewhere in the specification and claims, individual numerical values, or limits, can be combined to form additional non-disclosed and/or non-stated ranges.

In still yet another embodiment, the one or more hydrogen bond acceptor chain extenders of the present invention are selected from compounds according to the formula below:

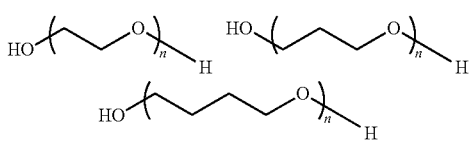

where the above compounds have a suitable number of n repeating units to have a molecular weight of about 100 grams per mole to about 1,250 grams per mole, or from about 125 grams per mole to about 1,000 grams per mole, or from about 150 grams per mole to about 900 grams per mole, or from about 200 grams per mole to about 750 grams per mole, or from about 225 grams per mole to about 650 grams per mole, or even from abut 250 grams per mole to about 500 grams per mole. In another embodiment, the above compounds have a suitable number of n repeating units to have a molecular weight of about 150 grams per mole to about 650 grams per mole. Here, as well as elsewhere in the specification and claims, individual numerical values, or limits, can be combined to form additional non-disclosed and/or non-stated ranges.

In still yet another embodiment, the one or more hydrogen bond acceptor chain extenders of the present invention are selected from compounds according to the formula below:

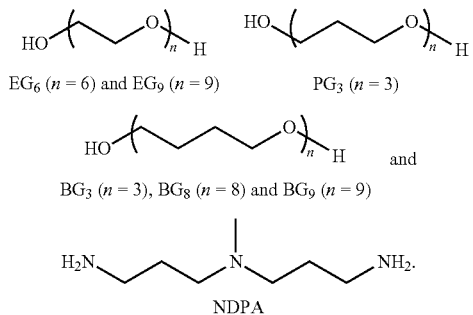

EG$_6$ (n = 6) and EG$_9$ (n = 9)    PG$_3$ (n = 3)

BG$_3$ (n = 3), BG$_8$ (n = 8) and BG$_9$ (n = 9)

NDPA

In still yet another embodiment, the one or more HACE compounds utilized in conjunction with the present invention can be selected from one or more of poly(propylene glycol), poly(butylene glycol), and/or poly(hexmethylene carbonate) where such compounds have a molecular weight of about 100 grams per mole to about 1,250 grams per mole, or from about 125 grams per mole to about 1,000 grams per mole, or from about 150 grams per mole to about 900 grams per mole, or from about 200 grams per mole to about 750 grams per mole, or from about 200 grams per mole to about 650 grams per mole, or even from abut 250 grams per mole to about 500 grams per mole. In another embodiment, these compounds have a suitable number of n repeating units to have a molecular weight of about 150 grams per mole to about 650 grams per mole. Here, as well as elsewhere in the specification and claims, individual numerical values, or limits, can be combined to form additional non-disclosed and/or non-stated ranges.

Additionally, regarding various HACE compounds that are discussed above and are utilized in conjunction with the present invention, the terminal —OHs or —NH$_2$s provide chain extension functionalities while the ether oxygens (or amine nitrogens) provide hydrogen bond accepting sites. In another embodiment the molecular weight range of the HACE compounds discussed above impart flexibility within the hard segment.

In light of the above, in one embodiment the following Equation (1) is/can be utilized to calculate the amount of HACE used in the polyurethane compositions in accordance with the present invention:

$$n_{HACE} = \frac{n_{DI} \cdot \overline{DP_{CE+DI}}}{m} \quad \text{Equation (1)}$$

where $n_{HACE}$ is the mole amount of HACE, $n_{DI}$ is the mole amount of diisocyanate (DI), $\overline{DP_{CE+DI}}$ is the degree of polymerization of the hard segments (i.e., segments formed of the chain extenders (CEs) and diisocyanates (DIs) excluding HACEs disclosed above), and m is the number of H-bond accepting sites in one unit of HACE (e.g., m=9 in Equation (1) for BG$_9$). Additionally, according to Equation 2 below $$\overline{DP_{CE+DI}} = \frac{n_{CE}}{n_{DI} - n_{CE}} \quad \text{Equation (2)}$$

where $n_{CE}$ is the mole amount of chain extender (CE). According to Equation (1) the amount of HACE increases with the amount of diisocyanate (DI) and the degree of polymerization of the hard segment, and decreases with the number of hydrogen bond accepting sites in the HACE. In one embodiment, the amount of HACE in the polyurethane compounds of the present invention is in the range of about 5.2 weight percent to about 13.1 weight percent. This range is in addition to the weight ranges disclosed above for the HACE segments/portion of the present invention.

Regarding the synthesis methods for producing the polyurethane compounds of the present invention, Synthesis Scheme 1 below discloses one such embodiment. It should be noted that the present invention is not limited to solely the synthesis method of Synthesis Scheme 1, rather other suitable synthesis routes could be employed to produce the polyurethanes of the present invention.

Synthesis Scheme 1

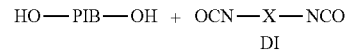

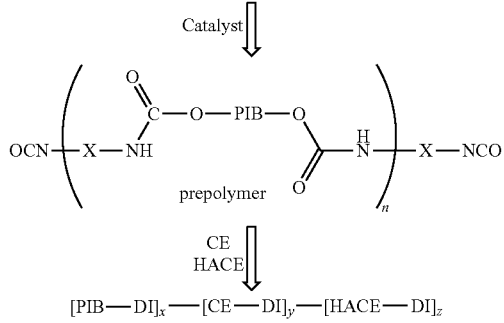

As detailed above in Synthesis Scheme 1, in one embodiment the synthesis scheme of the present invention yields PIB-based HACE-reinforced PUs FIG. 1 illustrates the micro-morphology of the polyurethanes in accordance with the present invention. Regarding Synthesis Scheme 1, although the synthesis is illustrated with HO-PIB-OH as the starting material for the soft segment H$_2$N-PIB-NH$_2$ or a mixture of HO-PIB-OH and H$_2$N-PIB-NH$_2$ can be utilized in other embodiments in accordance with the present invention. The nature of the HO-PIB-OH and H$_2$N-PIB-NH$_2$ utilized in conjunction with the present invention are detailed above and as such a repeat discussion hereof is omitted for the sake of brevity. OCN—X—NCO stands for the one or more diisocyanates (DI) where X=—$C_6H_{11}$—$CH_2$—$C_6H_{11}$—, or —$C_6H_5$—$CH_2$—$C_6H_5$—, or —$(CH_2)_n$— where n is equal to an integer in the range of 2 to 8. In another embodiment, as would be apparent from the discussion above, X can be any chemical structure located between the two —NCO groups in the diisocyanates disclosed above. Regarding the catalyst utilized in Synthesis Scheme 1, any catalyst suitable to accelerate the reaction of one or more glycols with one or more diisocyanates can be employed. Such catalysts are known to those of skill in the art and as such a detailed discussion herein is omitted for the sake of brevity. In another embodiment, the catalyst utilized in Synthesis Scheme 1 above is $SnBu_2L_2$, where Bu is a butyl group, and L is a lauryl group, or any other catalyst commonly used for the condensation of glycols with diisocyanates. Such catalysts are known to those of skill in the art and as such a detailed discussion herein is omitted for the sake of brevity. CE and HACE are as defined above and thus a repeat discussion hereof is omitted for the sake of brevity.

In one embodiment, the structure of the prepolymer is controlled by the stoichiometry of the starting ingredients with suitable ranges being able to be determined from the Examples detailed in Table 1 below. In the second step the prepolymer is reacted with a chain extender (CE) can be a glycol or diamine such as, but not limited to, those disclosed above. In one embodiment, the CE is HO—$(CH_2)$—OH and one or more suitable HACEs as defined above. In one embodiment, the CE and the one or more HACEs can be premixed or added separately. In another embodiment, the CE can be a glycol or a diamine such as $H_2N$—$(CH_2)_6$—$NH_2$, or even mixtures of a glycol and diamine such as a mixture of HO—$(CH_2)$—OH and $H_2N$—$(CH_2)_6$—$NH_2$. Again, as is discussed above, the present invention is not limited to just these CEs or combinations of CEs. Rather, any CE, or combination of CEs, discussed above can be utilized in conjunction with the present invention.

Regarding the variables x, y and z in the final structure shown in Synthesis Scheme 1, in one embodiment the variables are determined by the nature of the starting materials. As such, a specific definition thereof is not necessary. In another embodiment, variables x, y and z are selected in view of both the starting materials utilized and the final $M_n$ desired in the polyurethane product of the present invention. In one embodiment, the $M_n$ of the polyurethanes produced in accordance with the present invention are in the range of about 60,000 grams per mole to about 300,000 grams per mole, or from about 65,000 grams per mole to about 275,000 grams per mole, or from about 70,000 grams per mole to about 250,000 grams per mole, or from about 75,000 grams per mole to about 225,000 grams per mole, or form about 80,000 grams per mole to about 200,000 grams per mole, or from about 85,000 grams per mole to about 175,000 grams per mole, or from about 90,000 grams per mole to about 150,000 grams per mole, or from about 95,000 grams per mole to about 125,000 grams per mole, or even from about 100,000 grams per mole to about 115,000 grams per mole. Here, as well as elsewhere in the specification and claims, individual numerical values, or limits, can be combined to form additional non-disclosed and/or non-stated ranges.

In another embodiment, the $M_n$ of the polyurethanes produced in accordance with the present invention can be outside of the ranges stated above so long as the starting materials utilized to form such polyurethanes are selected from those disclosed above.

Turning to FIG. 1, FIG. 1 illustrates one morphology of PIB-based PUs of the present invention that are prepared with HACE in the relaxed and in the stressed state. The hard segments present complex morphologies. In contrast to typical hard segments formed of DIs plus CEs in conventional PUs, the hard segments in HACE-containing PIB-based PUs are complex composites of conventional [DI+CE]$_n$ units where n is, in one embodiment, equal to 1 or 2) linked and/or attached both by covalent and hydrogen bonds to flexible HACE segments (see the enlarged portions of FIG. 1). The hydrogen bonds due to HACEs, which are indicated by thin black lines in FIG. 1, provide reinforcement in addition to the hydrogen bonds present in the PU hard segments, and the flexible HACE segments are able to mediate are able morphological reorganization of the hard phase under stress. While not wishing to be bound to any one theory, it is believed that the increased number of hydrogen bonds and conformational realignment impart enhanced mechanical properties including toughening to the PUs of the present invention.

It should be noted that the mechanism of reinforcement in PIB-based HACE-containing PUs of the present invention is fundamentally different from that operating in PIB-based PUs reinforced by soft co-segments: whereas reinforcement in the latter PUs is likely due to improved compatibility between the hard and soft segments mediated by the soft co-segments (improved stress transfer from the hard to the soft segments) reinforcement in the HACE-containing PUs of the present invention is due to the increased number of hydrogen bonds and conformational reorganization of flexible segments entirely within the hard segments.

The following examples are exemplary in nature and the present invention is not limited thereto. Rather, as is noted above, the present invention relates to the production and/or manufacture of various polyurethane (PU) compounds.

EXPERIMENTAL

Materials:
Amine telechelic and hydroxyl telechelic PIB ($H_2N$-PIB-$NH_2$ and HO-PIB-OH) having a molecular weight of 3,500 grams per mole are prepared by a suitable method (see the discussion above). For stability experiments a 4,000 gram per mole HO-PIB-OH is utilized. Chemicals purchased from Aldrich are: hydroxyl terminated tetramethylene oxide oligomers having an $M_n$=1,000 (PTMO), BG$_9$ having a molecular weight of 650 grams per mole, and BG$_3$ having a molecular weight of 250 grams per mole; polyethylene glycol oligomers having an $M_n$=400 (EG$_9$) and 264 (EG$_G$); tripropylene glycol (PG$_3$); butene diol (BDO); hexane diol (HDO); hexamethylene diamine (HDA); 3,3'-diamino-N-methyldipropylamine (NDPA); hexamethylene diisocyanate (HDI); bis(4-isocyanatocyclohexyl)methane (HMDI); bis(4-isocyanatophenyl)methane (MDI), and dibutyltin dilaurate. Reagent grade tetrahydrofuran (THF) is obtained form Fisher Chemicals and used after distillation. HNO$_3$ (70 percent aqueous solution) is obtained from J. T. Baker, and 35 percent solutions are prepared by dilution with MilliQ water.

Synthesis:
Polyurethanes, polyurea-urethanes (prepared by using amine-telechelic PIB plus hydroxyl-telechelic chain extender), and polyurethane-ureas (prepared by using hydroxyl-telechelic PIB plus mine-telechelic chain extender) are synthesized by a two step prepolymer method. Representative synthetic procedures are as follows.

Example 1

Example 1 is prepared by using a 10 mL glass vial (reactor) equipped with a magnetic stirrer. $H_2N$-PIB-$NH_2$ (0.7 grams, 0.2 mmol, $M_n$=3500 g/mol) is weighed into the reactor, flushed with $N_2$, and dissolved in 3 mL tetrahydrofuran.

HMDI (0.223 grams, 0.851 mmol) is added and the resulting solution is stirred for 5 minutes to obtain the prepolymer. HDO (0.077 grams, 0.651 mmol) and DBTL catalyst (0.005 grams) are weighed in a separate vial, dissolved in 1 mL of tetrahydrofuran, and then added to the prepolymer solution. The charge is placed in a 60° C. bath and is stirred for 12 hours. Progress of the reaction is monitored by IR spectroscopy as is known to those of skill in the art. After the reaction is complete, the highly viscous solution is diluted with about 5 mL of tetrahydrofuran and poured into a 5 cm×5 cm glass rectangular mold. The solvent is evaporated under ambient conditions, and the product is dried at 50° C. in a vacuum oven, until a constant weight is obtained. Examples 19 and 21 of Table 1 are also prepared by the above method.

Example 6

Example 6 is prepared in a 10 mL vial equipped with a magnetic stirrer into which is weighed $H_2N$-PIB-$NH_2$ (0.7 grams, 0.2 mmol). Next, the system is flushed with $N_2$, and the polymer is dissolved in 3 mL of tetrahydrofuran. HMDI (0.198 grams, 0.754 mmol) is added and the solution is stirred for 5 minutes to obtain a prepolymer. HDO (0.033 grams, 0.277 mmol), $BG_3$ (0.069 grams, 0.277 mmol) and the DBTL catalyst (0.005 grams) are weighed into a separate vial and are dissolved in 1 mL of tetrahydrofuran. The chain extender solution with the catalyst is added to the prepolymer solution, the vial is placed in a 60° C. bath and the system is stirred for 12 hours. Progress of the reaction is monitored by IR spectroscopy as is known to those of skill in the art. The highly viscous solution is diluted with about 5 mL of tetrahydrofuran and poured into a 5 cm×5 cm glass mold. The solvent is removed in air and the sample is dried at 50° C. in a vacuum oven, until a constant weight is obtained. Examples 4, 7, 8, 10, 20 and 22 of Table 1 are also prepared by the above method.

Example 13

Example 13 is prepared in a 10 mL vial equipped with a magnetic stirrer. HO-PIB-OH (0.6 grams, 0.17 mmol) and the DBTL catalyst (0.005 grams) are weighed into the reactor, the vial is flushed with $N_2$ and the polymer is dissolved in 3 mL of tetrahydrofuran. HMDI (0.221 grams, 0.842 mmol) is added and the solution is stirred for 2 hours at 60° C. to obtain the prepolymer. HDO (0.057 grams, 0.483 mmol), and $BG_9$ (0.122 grams, 0.188 mmol) are weighed into a separate vial and are dissolved in 1 mL tetrahydrofuran. The chain extender solution is added to the prepolymer solution, the vial is placed in a 60° C. bath and is stirred for 12 hours. Progress of the reaction is monitored by IR spectroscopy as is known to those of skill in the art. The highly viscous solution is diluted with about mL of tetrahydrofuran and poured into a 5 cm×5 cm glass mold. The solvent is removed in air and the sample is dried at 50° C. in a vacuum oven, until a constant is obtained. Examples 11, 12 and 14 are prepared using this synthesis method except for Example 14 which utilizes a mixture of HDO and HDA.

Instrumentation:

Dynamic mechanical thermal analysis (DMTA) is performed by a PerkinElmer dynamic mechanical analyzer. Measurements are made in tensile mode at 1 Hz, between −100° C. and 200° C., under a nitrogen atmosphere, at a 3° C./min heating rate.

Shore Durometer Hardness (Microshore) is determined using about 0.5 mm thick films by a Micro-O-Ring Hardness Tester, Model 714 by Instron. The Microshore scale is identical/equivalent to the Shore A scale, see ASTM D2240. Averages of three determinations are reported. Stress-strain behavior is determined by an Instron Model 5543 Universal Tester controlled by Series Merlin 3.11 software. A bench-top die (ASTM 1708) is used to cut 30 mm dog-bone samples (70×3.15×0.2 mm) from the films.

Differential scanning calorimetry (DSC) is used to obtain melting ($T_m$) and glass transition temperatures ($T_g$) by a TA Instruments Q2000 Differential Scanning Calorimeter with 5 to 10 mg samples enclosed in aluminum pans, and heated 10° C./min from −100° C. to 200° C.

Oxidative/Hydrolytic Stability:

Oxidative/hydrolytic stability is tested by exposing samples to nitric acid. PU films (about 200 µm thick) are cast from THF solutions, and dumbbells are cut with a die (25 mm long excluding the grips, 3.175 mm width at the neck). Samples are placed in 35 percent aqueous $HNO_3$ and agitated at 500 rpm for 4 hours and 18 hours at room temperature. The samples are thoroughly rinsed with water, blot dried with soft tissue paper, and dried under a vacuum for at least two days prior to mechanical testing. The degree of oxidative/hydrolytic resistance is quantitatively assessed by determining retention of tensile strength and elongation after exposure to the acid. Retention of tensile strength ($R_T$) is calculated by:

$$R_T = \frac{T_{after}}{T_{before}} \times 100,$$

where $T_{after}$ and $T_{before}$ are the tensile strengths after and before $HNO_3$ exposure, respectively. Retention of elongation is calculated similarly.

PIB-Based HACE-Reinforced PUs: Synthesis and Mechanical Properties:

In one embodiment, the present invention relates to the preparation of PUs containing from about 60 weight percent to about 70 weight percent PIB, wherein such compounds have a HACE content as detailed above. While not wishing to be bound to any one theory, a heretofore unobtainable set of properties are expected due to the simultaneous presence of large amounts of PIB (e.g., as defined above or from about 60 weight percent to about 70 weight percent) that protect the oxidatively/hydrolytically vulnerable hard segments, and appropriate amounts of HACEs that, in agreement with the embodiments disclosed above, which augment the number of reinforcing hydrogen bonds and thus provide enhanced mechanical properties.

Table 1 summarizes PUs prepared together with select mechanical properties. The first 17 columns show the amounts of the various ingredients that define compositions, $\overline{DP_{CE+DI}}$, and molecular weights, and the last three columns provide tensile strength, elongation, and hardness. The headings within the table indicate subdivisions.

Table 2 summarizes the retention of properties of representative PIB-based HACE-reinforced polyurethanes before and after exposure to 35 percent $HNO_3$ at room temperature at 500 rpm for 4 hours and 18 hours (averages of 2 to 3 measurements).

TABLE 1

Polyurethane Compositions and Properties

| Ex. | PIB[a] % | EG | g | mmol | DI | g | mmol | CE | g | mmol | HACE | g/mol | g | mmol[b] | DP$_{CE+DI}$ | Mn[c] g/mol | TS MPa | E % | H |
|---|---|---|---|---|---|---|---|---|---|---|---|---|---|---|---|---|---|---|---|
| Polyurea-Urethanes with HMDI |||||||||||||||||||||
| 1 | 70 | —NH$_2$ | 0.7 | 0.200 | HMDI | 0.233 | 0.851 | HDO | 0.077 | 0.651 | — | — | — | — | 3.3 | 88000 | 19.0 | 310 | 74 |
| 2 | 70 | —NH$_2$ | 0.7 | 0.200 | HMDI | 0.204 | 0.778 | HDO | 0.046 | 0.387 | EG$_6$ | 264 | 0.050 | 0.191 | 1.0 | 97000 | 18.7 | 330 | — |
| 3 | 70 | —NH$_2$ | 0.7 | 0.200 | HMDI | 0.196 | 0.746 | HDO | 0.048 | 0.404 | EG$_9$ | 400 | 0.057 | 0.142 | 1.2 | 92000 | 20.3 | 450 | — |
| 4 | 70 | —NH$_2$ | 0.7 | 0.200 | HMDI | 0.219 | 0.835 | BDO | 0.020 | 0.307 | PG$_3$ | 192 | 0.061 | 0.320 | 0.6 | — | 22.8 | 320 | 74 |
| 5 | 70 | —NH$_2$ | 0.7 | 0.200 | HMDI | 0.213 | 0.814 | HDO | 0.028 | 0.307 | PG$_3$ | 192 | 0.059 | 0.307 | 0.6 | 114000 | 23.1 | 420 | 74 |
| 6 | 70 | —NH$_2$ | 0.7 | 0.200 | HMDI | 0.198 | 0.754 | HDO | 0.033 | 0.277 | BG$_3$ | 250 | 0.069 | 0.277 | 0.6 | 145000 | 21.4 | 370 | 76 |
| 7 | 70 | —NH$_2$ | 0.7 | 0.200 | HMDI | 0.194 | 0.738 | HDO | 0.054 | 0.457 | BG$_9$ | 650 | 0.052 | 0.081 | 1.6 | 186000 | 24.2 | 570 | 64 |
| 8 | 70 | —NH$_2$ | 0.7 | 0.200 | HMDI | 0.169 | 0.645 | HDO | 0.042 | 0.356 | PTMO[d] | 100 | 0.089 | 0.089 | 1.2 | — | 15.3 | 340 | 59 |
| 9 | 70 | —NH$_2$ | 0.7 | 0.200 | HMDI | 0.088 | 0.526 | — | — | — | BG$_9$ | 650 | 0.212 | 0.326 | 0 | — | 11.0 | 900 | — |
| 10 | 60 | —NH$_2$ | 0.6 | 0.171 | HMDI | 0.216 | 0.822 | HDO | 0.053 | 0.449 | BG$_9$ | 650 | 0.131 | 0.202 | 1.2 | 212000 | 29.2 | 620 | 80 |
| Polyurethanes and Polyurethane-Ureas with HDMI |||||||||||||||||||||
| 11 | 70 | —OH | 0.7 | 0.200 | HMDI | 0.223 | 0.851 | HDO | 0.077 | 0.651 | — | — | — | — | 3.3 | — | 17.4 | 480 | 63 |
| 12 | 70 | —OH | 0.7 | 0.200 | HMDI | 0.175 | 0.668 | HDO | 0.040 | 0.337 | BG$_9$ | 650 | 0.085 | 0.131 | 1.0 | — | 14.8 | 980 | 69 |
| 13 | 60 | —OH | 0.6 | 0.171 | HMDI | 0.221 | 0.842 | HDO | 0.057 | 0.483 | BG$_9$ | 650 | 0.122 | 0.188 | 1.3 | — | 28.1 | 690 | 79 |
| 14 | 70 | —OH | 0.7 | 0.200 | HMDI | 0.175 | 0.668 | HDO HDA | 0.02 0.02 | 0.17 0.16 | BG$_9$ | 650 | 0.085 | 0.131 | 1.1 | — | 20.1 | 700 | 62 |
| 15 | 70 | —OH | 0.7 | 0.200 | HMDI | 0.172 | 0.668 | HDO | 0.02 | 0.16 | BG$_9$ NPDA | 650 154 | 0.083 0.02 | 0.128 0.16 | 1.0 | — | 20.5 | 720 | — |
| Polyurea-Urethanes with HDI |||||||||||||||||||||
| 16 | 70 | —NH$_2$ | 0.7 | 0.200 | HDI | 0.190 | 1.131 | HDO | 0.110 | 0.931 | — | — | — | — | 4.7 | — | 21.5 | 570 | — |
| 17 | 70 | —NH$_2$ | 0.7 | 0.200 | HDI | 0.161 | 0.957 | HDO | 0.045 | 0.378 | BG$_3$ | 250 | 0.095 | 0.378 | 0.7 | — | 21.1 | 750 | — |
| 18 | 70 | —NH$_2$ | 0.7 | 0.200 | HDI | 0.141 | 0.837 | — | — | — | BG$_3$ | 250 | 0.159 | 0.637 | 0.0 | — | 9.4 | 1100 | — |
| Polyurea-Urethanes with MDI |||||||||||||||||||||
| 19 | 70 | —NH$_2$ | 0.7 | 0.200 | MDI | 0.234 | 0.935 | BDO | 0.066 | 0.735 | — | — | — | — | 3.7 | — | 9.9 | 350 | 81 |
| 20 | 70 | —NH$_2$ | 0.7 | 0.200 | MDI | 0.210 | 0.839 | BDO | 0.029 | 0.320 | PG$_3$ | 192 | 0.061 | 0.320 | 0.6 | — | 19.6 | 420 | 80 |
| 21 | 70 | —NH$_2$ | 0.7 | 0.200 | MDI | 0.220 | 0.879 | HDO | 0.080 | 0.679 | — | — | — | — | 3.4 | — | 11.5 | 390 | 77 |
| 22 | 70 | —NH$_2$ | 0.7 | 0.200 | MDI | 0.171 | 0.684 | HDO | 0.041 | 0.348 | BG$_9$ | 650 | 0.088 | 0.135 | 1.0 | — | 18.9 | 550 | 69 |

[a]Mn = 3500 grams per mole
[b]Calculated by Equation (1)
[c]Estimated by GPC
[d]PTMO (Mn = 1000 grams per mole) soft co-segment
Abbreviation—Ex. = Example; % = weight percent PIB; EG = end group; TS = tensile strength; E = elongation; and H = hardness.

TABLE 2

| Example/Sample | PIB (Wt %) | Before Exposure | | After Exposure | | | | | |
|---|---|---|---|---|---|---|---|---|---|
| | | | | 4 Hours of Exposure | | Retention (Tensile %/ Elongation %) | 18 Hours of Exposure | | Retention (Tensile %/ Elongation %) |
| | | Tensile (MPa) | Elongation (%) | Tensile (MPa) | Elongation (%) | | Tensile (MPa) | Elongation (%) | |
| PIB-Based Polyurethanes |||||||||||
| Example 14[a] | 70 | 19.2 ± 0.5 | 610 ± 11 | 20.7 | 640 | 108%/105% | 21.0 ± 0.5 | 690 ± 3 | 109%/113% |
| Example 13[a] | 60 | 27.0 ± 0.4 | 728 ± 12 | 24.8 ± 1.2 | 770 ± 25 | 92%/106% | 14.5 ± 2 | 680 ± 60 | 57%/96% |
| PTMO-reinfor. PIB—PU[a,b] | 50 | 30.1 ± 1.1 | 810 ± 80 | 0.3 ± 0.2 | 90 ± 30 | 1%/11% | degraded | degraded | 0% |
| Controls |||||||||||
| Bionate 80A | 0 | 60.1 ± 9 | 470 ± 39 | 12.8 ± 2.2 | 470 ± 15 | 21%/100% | Degraded | Degraded | N/A |
| Elast-Eon E2A | 0 | 19.9 ± 3.34 | 460 ± 75 | 3.0 | 50 | 15%/11% | 0.6 | 20 | 3%/4% |
| SIBSTAR 073T | 70 | 13.7 ± 5.5 | 510 ± 21 | 13.4 ± 1.2 | 520 ± 43 | 98%/102% | 13.4 ± 0.8 | 510 ± 23 | 98%/100% |
| Carbothane | | >30.9 | >760 | Yellow gooey mass, not able to test | Yellow gooey mass, not able to test | N/A | Yellow gooey mass, not able to test | Yellow gooey mass, not able to test | N/A |

[a]Mn (HO—PIB—OH) = 4000 grams per mole, see Table 1
[b]PTMO reinforced PIB—PU with 50 weight percent PIF - sample HO—PIB—OH (4K, 50%)/HMDI + PTMO + HDO = 50%

Examination of Examples 1, 7, and 9 clearly demonstrate the beneficial effect of $BG_9$ (a HACE) on mechanical properties. Comparison of Examples 1 and 9 (i.e., Example 1 contains only a conventional CE (HDO) but no HACE and Example 9 contains no conventional CE but only HACE) illustrates that neither a conventional CE nor a HACE alone provides high mechanical properties. Superior mechanical properties are obtained in the presence of both a conventional CE and a HACE (Example 7—tensile strength 24.2 MPa and elongation 570 percent), indicating the importance of appropriate concentration of hydrogen bond accepting and donating sites within the hard segment (see also the discussion above regarding Equation 1).

The Effect of HACE Molecular Weight:

Examination of Examples 1 through 10 further demonstrates the mechanical properties enhancing effect of $EG_6$, $EG_9$, $PG_3$, $BG_3$, and $BG_9$. While the tensile strength of the reference PU prepared in the absence of HACE (Example 1) exhibits modest properties (19 MPa tensile strength and 310 percent elongation), products prepared in the presence of HACEs show a marked and significant enhancement both in tensile strength and elongation (see Examples 3 through 7 and 10, Table 1).

Figure 2A:
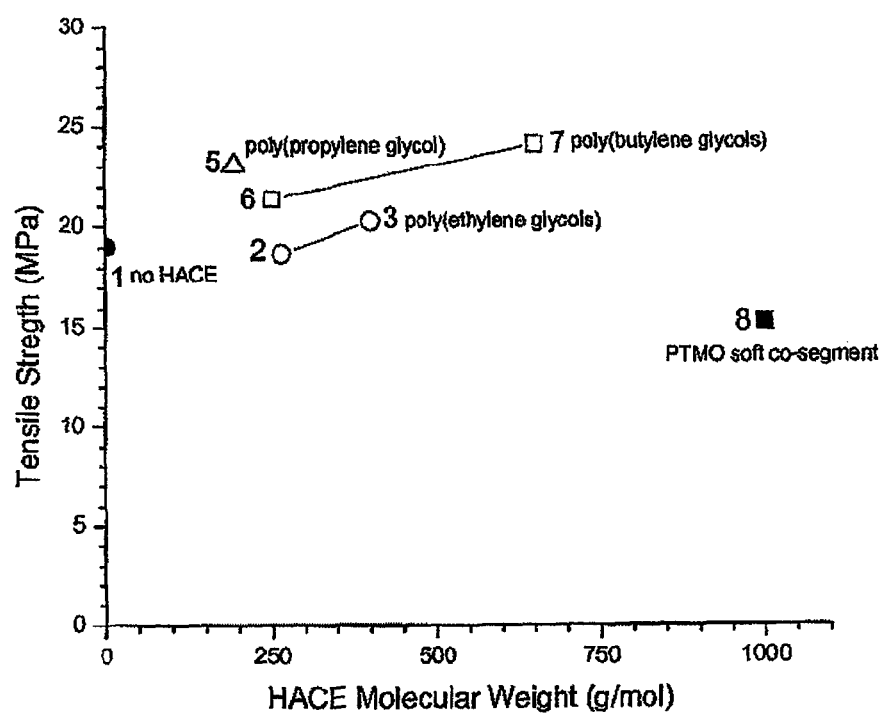
FIGS. 2a and 2b are graphs illustrating the tensile strengths and elongations of polyurea-urethanes prepared with various HACEs as a function of HACE molecular weight (labeling corresponds to the Examples in Table 1 below)
Figure 2B:
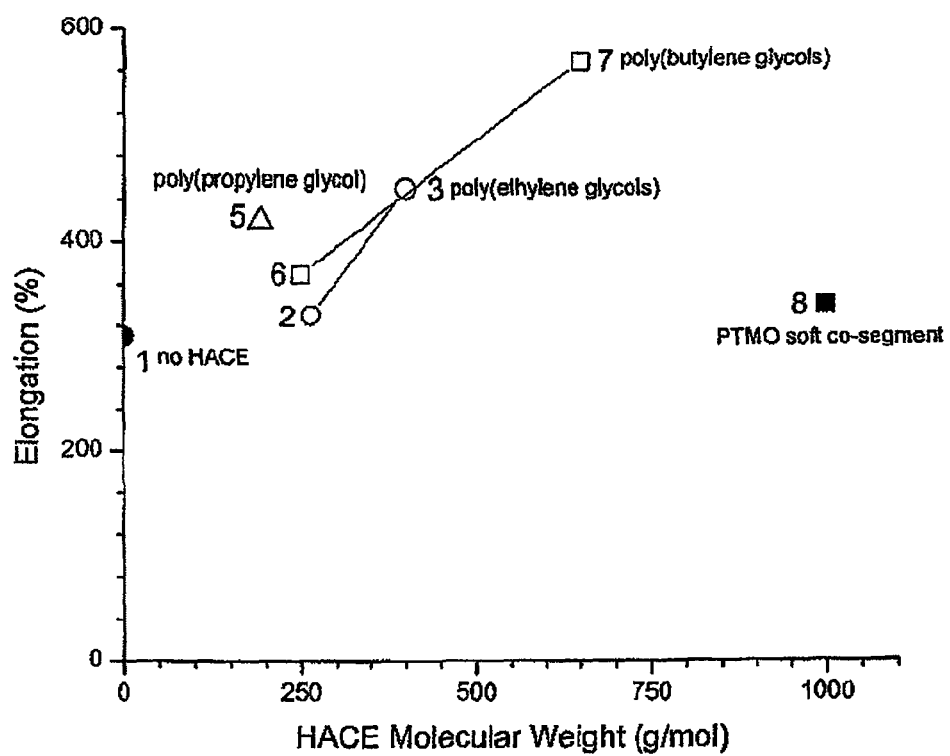

FIGS. 2a and 2b illustrate the effect of HACE molecular weight on tensile strength and elongation, respectively. Tensile strengths and elongations increase with molecular weight of the HACEs up to 650 grams per mole, however, at higher molecular weights, i.e., with PTMO of 1000 grams per mole (Example 8, Table 1), both tensile strength and elongation decrease dramatically.

Examination of PUs made with various polyether-type HACEs also shows significant differences: while the use of ethylene glycol oligomers (e.g., $EG_6$ and $EG_9$) exhibited only moderate improvements, propylene glycol and butylene glycol oligomers (e.g., $PG_3$, $BG_3$, $BG_9$) gave markedly better tensile strengths and elongations. Importantly, PUs made with 1000 grams per mole PTMO (see Example 8) shows a decrease in mechanical properties, most likely because HACEs with molecular weights over 650 grams per mole do not remain confined within the hard segments and therefore cannot provide sufficient hydrogen bond accepting sites. While not wishing to be bound to any one theory, it is believed that such high molecular weight polyethers preferentially form soft co-segment with PIB. While not wishing to be bound to any one theory, it is believed that reinforcement by HACEs is likely due to the formation of hydrogen bonds between HACEs and urethane/urea groups which yields flexible hard segments and thus yields improved mechanical properties. Reinforcement by HACEs is not due to compatibility enhancement between the soft and hard segments as proposed earlier for PIB/PTMO-based PUs.

The Effect of Chain Extender Molecular Weight:

Previous research determined that HDO provides better mechanical properties than BDO in PIB-based Pus, which suggests that BDO/HMDI produces rigid crystalline hard segments, while HDO/HMDI yields more flexible hard segments. In experiments with HACE-containing PUs, however, HDO and BDO yielded similar mechanical properties (see Examples 4 and 5, Table 1). While not wishing to be bound to any one theory, it is believed that the HACE flexibilizes BDO-based hard segments, and the difference between the mechanicals of HDO- and BDO-based PUs becomes negligible.

Figure 3:
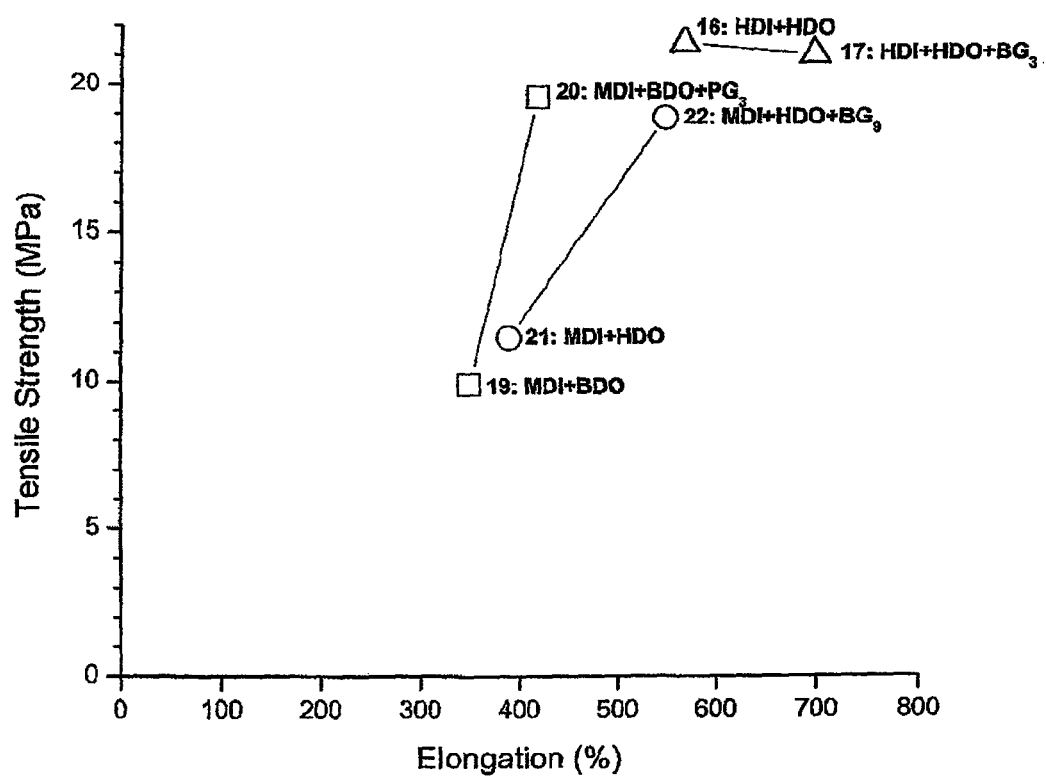
FIG. 3 is a graph illustrating the tensile strengths and elongations of polyurea-urethanes prepared with various diisocyanates (DIs) and conventional chain extenders (CEs) in the presence and absence of $PG_3$, $BG_3$ and $BG_9$ (labeling corresponds to the Examples in Table 1 below)

The Effect of MDI- and HDI-Based Hard Segments:

An investigation is conducted of the effect of HACEs on the mechanical properties of PUs prepared with various DI+CE combinations: HDI/HDO, MDI/BDO and MDI/HDO (see Examples 16 through 22, Table 1 and FIG. 3). PUs prepared with HDI/HDO show fairly good mechanical properties even in the absence of a HACE, and the addition of $PG_3$ does not increase tensile strength but increases elongation (see Examples 16 and 17, Table 1 and FIG. 3). In the absence of a conventional CE (Example 18, Table 1), the tensile strength is significantly lower, indicating the importance of appropriate concentration of hydrogen bonding within the hard segment. PUs made with MDI in the absence a HACE yielded poor mechanicals. However, the addition of a HACE nearly doubled the tensile strengths and enhanced elongations (compare Examples 19, 20, 21 and 22, Table 1). In the absence of a HACE, HDI- and HMDI-based PUs showed the best properties, while in the presence of a HACE, the HMDI/HDO hard segment is superior to the other combinations.

The Effect of Hard Segment Content:

Increasing the hard segment from 30 weight percent to 40 weight percent increases the tensile strengths, but left elongations largely unchanged (see Examples 7 and 10, Table 1: tensile strength increases from 24.2 to 29.2 MPa, but elongation remained about 600 percent). Consistent with previous data, PUs prepared with HO-PIB-OH shows a similar trend (see Examples 12 and 13, Table 1). A HACE is always included in the hard segment content, and the DUCE content of these PUs is still moderate; for example, Example 10 contains only 27 weight percent HMDI+HDO as compared to 21 weight percent in Example 7.

Figure 4:
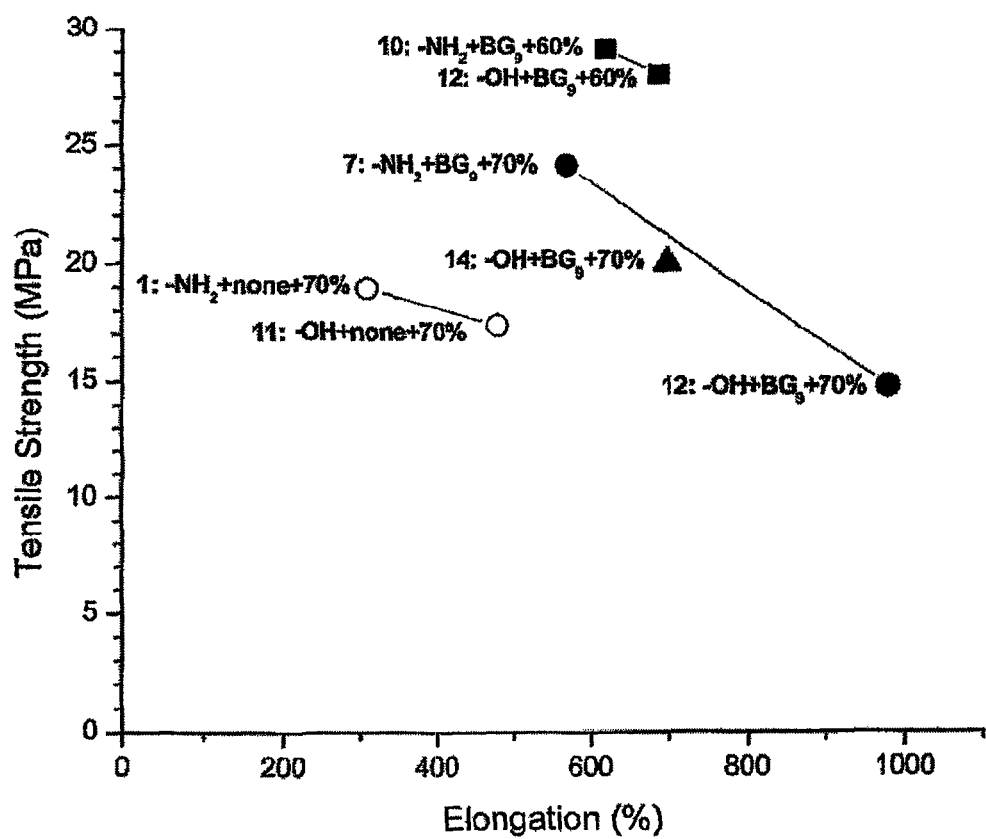
FIG. 4 is a graph illustrating tensile strengths and elongations of polyurea-urethanes and polyurethanes (labeling corresponds to the Examples in Table 1 below)

Comparison of Polyurethanes, Polyurea-Urethanes and Polyurethane-Ureas:

FIG. 4 summarizes the effect of urea and urethane groups on mechanical properties. Comparison of Example 1 of Table 1 (a polyurea-urethane) with Example 11 of Table 1 (a polyurethane) shows that in non-reinforced PUs the urea linkages enhance tensile strength from 17.4 MPa to 19 MPa, while elongation decreases from 480 percent to 310 percent. Comparison of Example 7 of Table 1 (a polyurea-urethane reinforced with $BG_9$) with Example 12 of Table 1 (a polyurethane reinforced with $BG_9$) shows the same trend: the urea linkages increase tensile strength but decrease elongation in HACE-reinforced PUs. The tensile strength of Example 12 is unexpectedly somewhat lower than that of Example 11 synthesized under the same conditions in the absence of HACE. Evidently, a delicate balance may exist between the flexibilizing effect of a HACE and the cohesive forces operating within the hard segment. If the hard segment is small and hydrogen bonding is weak (i.e., only urethane, no urea groups), the addition of a HACE, which flexibilizes the hard segment, may be, or is, counterproductive.

To further investigate the effect of urea linkages on mechanicals, an amine-terminated CE (HDA) is added to HDO and $BG_9$ (Example 14 of Table 1). The formation of urea linkages indeed improves the tensile strength from 14.8 MPa (Example 12—polyurethane) to 20.1 MPa (Example 14).

In one embodiment, the location of urea groups seems to affect mechanical properties. Example 7 (a polyurea-urethane) in which the urea groups are adjacent to the PIB soft segment exhibits higher tensile strength and lower elongation than Example 14 (a polyurethane-urea), in which the urea groups are within the hard segment (both samples of identical compositions).

Improvement in mechanical properties due to urea groups diminishes with increasing hard segment content: The difference between the tensile strengths of PUs made with $-NH_2$ and —OH telechelic PIBs is about 9 MPa at 30 weight percent hard segment (Examples 7 and 12, Table 1). However it decreases to about 2 MPa at 40 weight percent hard segment (Examples 10 and 13). Both Examples 10 and 13 show excellent tensile strengths: 29.2 MPa and 28.1 MPa. This result is not surprising because the concentration of urea groups attached to the PIB decreases with increasing hard segment content (i.e., with decreasing $H_2N$-PIB-$NH_2$ content).

PUs with Non-Polyether HACEs:

The experiments discussed above concerned the effect of polyether type HACEs on mechanical properties. It is also of interest to investigate the effect of NPDA, a tert amine with a sterically unencumbered strong hydrogen bond accepting site —$CH_2$—$N(CH_3)$—$CH_2$—. Comparison of Example 14 (with $BG_9$) and Example 15 (with NPDA) shows tensile strengths and elongations within experimental variation. The concentration of urea groups in both examples is the same (using HDA for Example 14 and $BG_9$ for Example 15).

Beyond NPDA, many other types of HACEs (e.g., carbonate-containing oligomers) can also be used in conjunction with the present invention. Earlier it has been shown that a PC soft co-segment increases the mechanicals of PIB-based PUs. The molecular weight of this PC (860 grams per mole) is near the high end of the molecular weight range of HACEs but the extended length of the 860 grams per mole PC is about 8 nm, which is not much larger than the value of about 7 nm for $BG_9$. Therefore, this PC may become part of the hard segment instead of forming a soft co-segment, and thus the mechanism of reinforcement might be different than suggested above in this instance.

Figure 5:
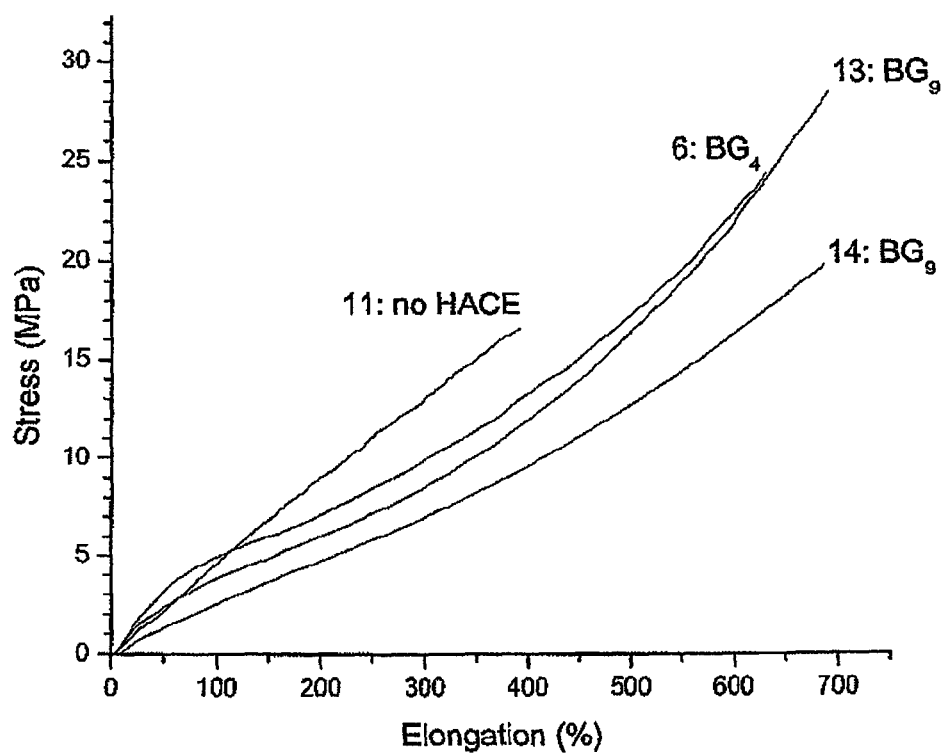
FIG. 5 is a graph illustrating various stress-strain traces of PIB-based PUs prepared with and without HACEs (labeling corresponds to the Examples in Table 1 below)

Analysis of Stress-Strain Curves:

FIG. 5 shows stress strain traces of three representative PIB-based PUs made with HACEs (Examples 6, 13 and 14) and a example made in the absence of a HACE (Example 11). While Example 11 PIB-based PU fails at about 400 percent elongation, the moduli of HACE-containing PUs kept increasing up to 700 percent elongation. Increased moduli are likely due to increased hydrogen bonding with HACEs, and to molecular reorganization of flexible HACE-containing hard segments under stress.

Shore Hardness of PIB-Based PUs:

The Shore A hardness (determined by Microshore durometer) of HACE-reinforced PUS were similar to those of PIB-based unreinforced PUs. The hardnesses of PUs with 70 weight percent PIB are in the 62 to 76 range. MDI-based hard segments increase the hardness, and PUs containing 40 weight percent hard segments exhibit about 80 Shore A hardness.

Figure 6:
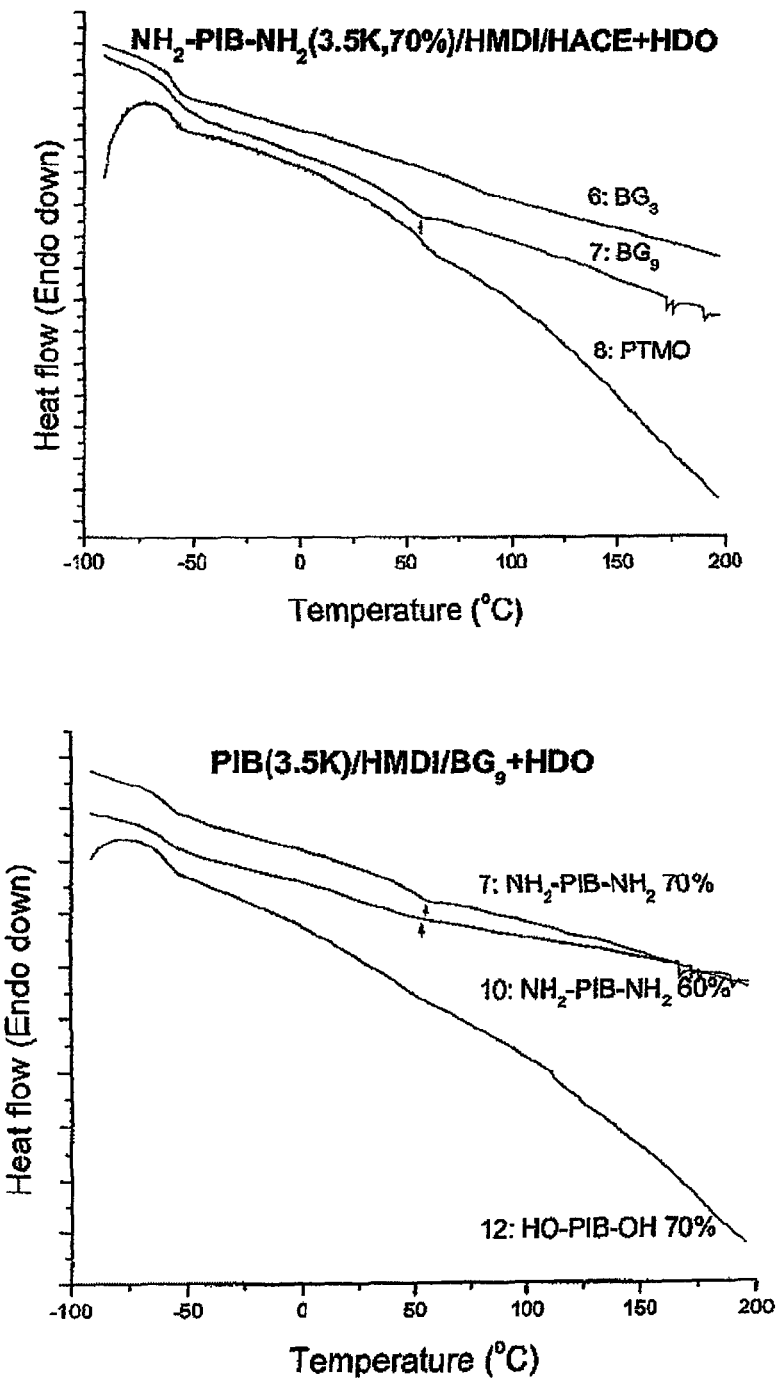
FIG. 6 is two graphs illustrating DSC traces of various polyurethanes, where the arrows indicate endotherms (labeling corresponds to the Examples in Table 1 below)

Thermal Properties—DSC Studies:

FIG. 6 is a graph illustrating DSC traces of representative PIB-based PUs made under various conditions and with various HACEs. All samples exhibit glass transition temperatures in the $-61°$ C. to $-57°$ C. range indicating the presence of PIB soft segments. The endothems at about 50° C. (indicated by small arrows) are not surprising in view of the low crystallization tendency and low DPn of the HMDI/HDO combination (DPn=1 to 2 for the PIB=70 weight percent, and DPn=2 to 3 for the PIB=60 weight percent sample). The absence of high melting transitions adumbrates thermal processability.

Figure 7:
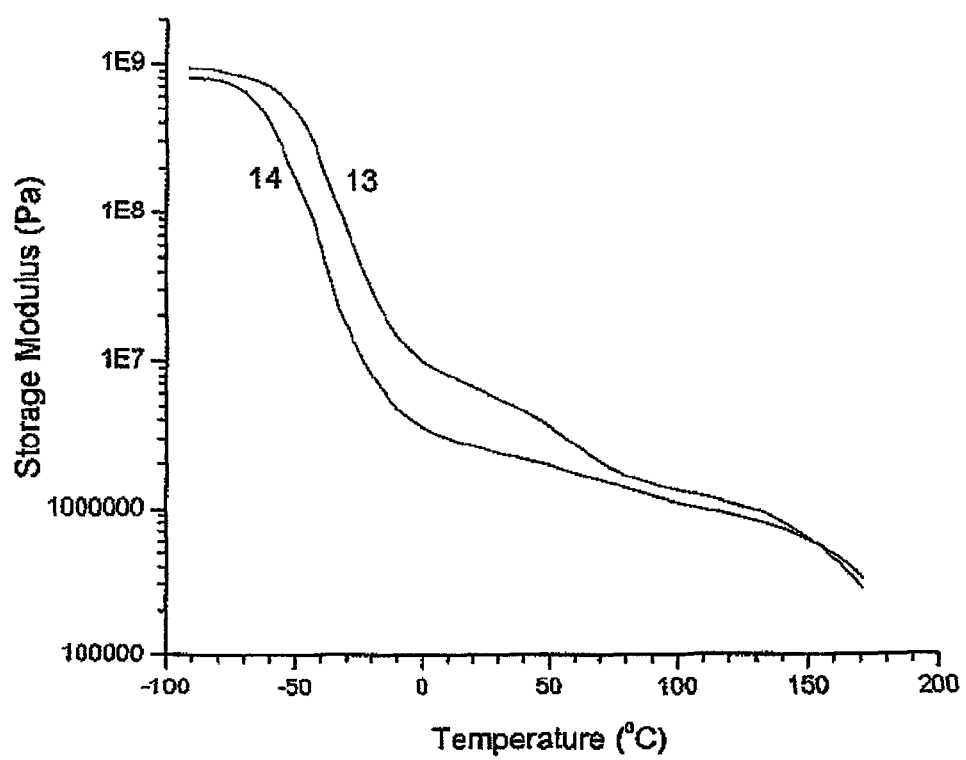
FIG. 7 is a graph illustrating DMTA traces of various polyurethanes (labeling corresponds to the Examples in Table 1 below)

DMTA Studies:

FIG. 7 shows the storage modulus as a function of temperature (DMTA traces) of Examples 13 and 14. The onset of the rubbery plateau occurs around $-20°$ C. Example 13 with 40 weight percent hard segments shows a melting transition at about 61° C. and a slight drop in the storage modulus due to melting but retains its elasticity up to about 140° C. The rubbery plateau of Example 14 is fairly flat and extends to about 150° C. The storage moduli of both polymers drop below a few hundred kPa at about 160° C., which indicates that in spite of the significant presence of urea linkages these materials will be thermally processable at moderate temperatures. This behavior is likely due to the presence of flexible $BG_9$ and to the low degree of polymerization of the HMDI/HDO hard segment combination.

Oxidative/Hydrolytic Stability:

The oxidative/hydrolytic stability of PIB-based HACE-containing PUs are investigated by exposure to nitric acid. Table 2 above summarizes stabilities of various PUs before and after exposure to 35 percent $HNO_3$ for 4 and 18 hours at room temperature. PIB-based PUs containing 70 weight percent PIB made with $BG_9$ exhibit about 100 percent retention of tensile strength and elongation after exposure to $HNO_3$ for 4 and 18 hours. Evidently, the presence of HACE did not compromise the oxidative/hydrolytic stability of the PIB-based PUs. When the HACE-containing hard segment increase from 30 weight percent to 40 weight percent (PIB content decreases from 70 weight percent to 60 weight percent)—tensile strength and elongation remain essentially unchanged after 4 hour of exposure to nitric acid. Exposure for 18 hours—retention of tensile strength decreases to 57 percent while elongation remains similar. Mechanical properties plummeted after exposure to nitric acid for both 4 and 18 hours using PTMO instead of HACE and reducing the PIB content to 50 weight percent. These studies clearly indicate that (1) PTMO-reinforced PU containing only 50 weight percent PIB has less desirable oxidative/hydrolytic stability, while (2) HACE reinforced PUs containing about 60 weight percent to about 70 weight percent PIB have more desirable oxidative/hydrolytic stability. In other words, PTMO yields good mechanical properties but poor oxidative/hydrolytic stability, whereas HACE yields both good mechanicals and excellent hydrolytic/oxidative stability. The increased oxidative/hydrolytic stability of PUs containing about 60 weight percent to about 70 weight percent PIB plus HACE is believed to be due to protection of the vulnerable hard segments by the surrounding continuous inert PIB phase.

Both controls, Elast-Eon and Bionate, PUs marketed for their "excellent" stability, severely degrade under the same conditions. SIBSTARB exhibits similar chemical stability to the 70 weight percent PIB content PU. However, its tensile strength was low (13.7 MPa).

Figure 8:
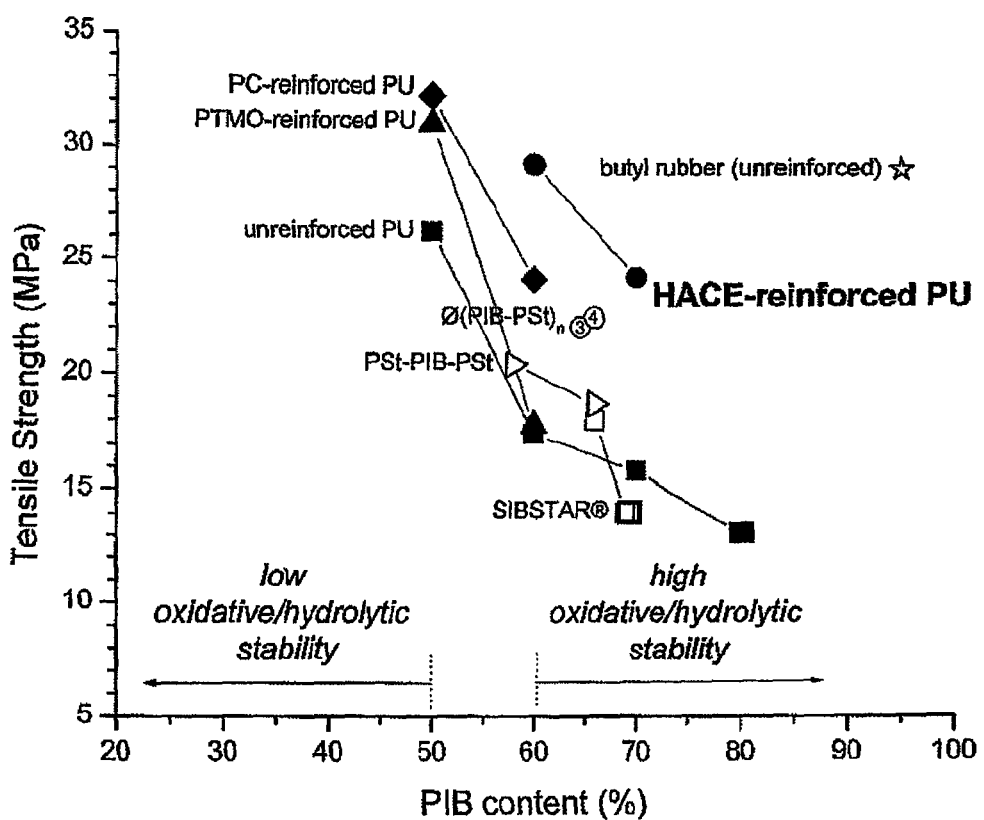
FIG. 8 is a graph illustrating tensile strengths of versus PIB content of various PIB-based TPEs and butyl rubber (HACE-reinforced PU: Examples 7 and 10 in Table 1 below; SIB-STAR: 103T and 073T; Ø(PIB-PSt)$_n$: numbers indicate arm number n)

Comparison of PIB-Based Rubbers:

FIG. 8 summarizes the tensile strengths of various PIB-based thermoplastic elastomers (TPEs) and butyl rubber (a vulcanized thermoset random copolymer of about 98.5 percent isobutylene and about 1.5 percent isoprene) as a function of PIB content. The PIB-based TPEs considered are: PIB-based PUs (unreinforced, as well as PTMO-, PC- and HACE-reinforced PUs); SIBSTAR (linear PSt-PIB-PSt tri-block copolymers of Kaneka Co.); PSt-PIB-PSt tri-block copolymers (linear SIBS) and ø(PIB-PSt), (PIB-PSt star block copolymers, where n=3 or 4) all with the highest tensile strengths reported to date.

Examination of the data in FIG. 8 yields valuable insight in regard to the performance characteristics of PIB-based rubbers: (a) the tensile strengths of HACE-reinforced PUs are superior to other PIB-based TPEs at 60 weight percent to 70 weight percent PIB; (b) the tensile strengths of PC- and PIB-based PTMO-reinforced PUs are higher than that of HACE-reinforced PUS at 50 weight percent PIB; (c) the tensile strengths of PIB-based PTMO-, PC- or HACE-reinforced PUs are much higher than that of SIBSTAR, the tensile strengths of unreinforced PIB-based PUs and SIBSTAR are about the same; and (d) the tensile strength of 60 weight percent PIB-containing HACE-reinforced PU is about the same as that of butyl rubber (about 30 MPa).

According to this comparison, the strengths of PIB-based PUs are vastly superior to the PSt hard segment containing PIB-based TPEs: e.g., tensile strengths of the former are 1.5 to 2 times higher than that of SIBSTAR. Remarkably, the tensile strength of butyl rubber is essentially identical to HACE-reinforced PUs. Thus, the most important message conveyed by FIG. 8 may be that, since the tensile strength and oxidative/hydrolytic stability of PIB-based HACE-reinforced PU rubber and butyl rubber are very similar, this PU may be viewed as a physically crosslinked (thermoplastic elastomeric) butyl rubber.

The tensile strength of 20 weight percent PTMO-reinforced PU is higher than that of the HACE-reinforced PUs at 50 weight percent PIB because PTMO is a stronger elastomer than PIB. The oxidative/hydrolytic stability of this polymer, however, is poor, only slightly better than that of conventional PTMO-based PUs.

It is worth mentioning that the linear tri-block SIBS have a slightly higher tensile strength than SIBSTAR. The discrepancy between these is probably due to di-block copolymer contaminations in SIBSTAR. The elongations of these TPEs (not shown) are unremarkable. With the I exception of high hard segment content unreinforced PIB-based PUs, all elongations are in the 500 percent to 700 percent range.

Figure 9:
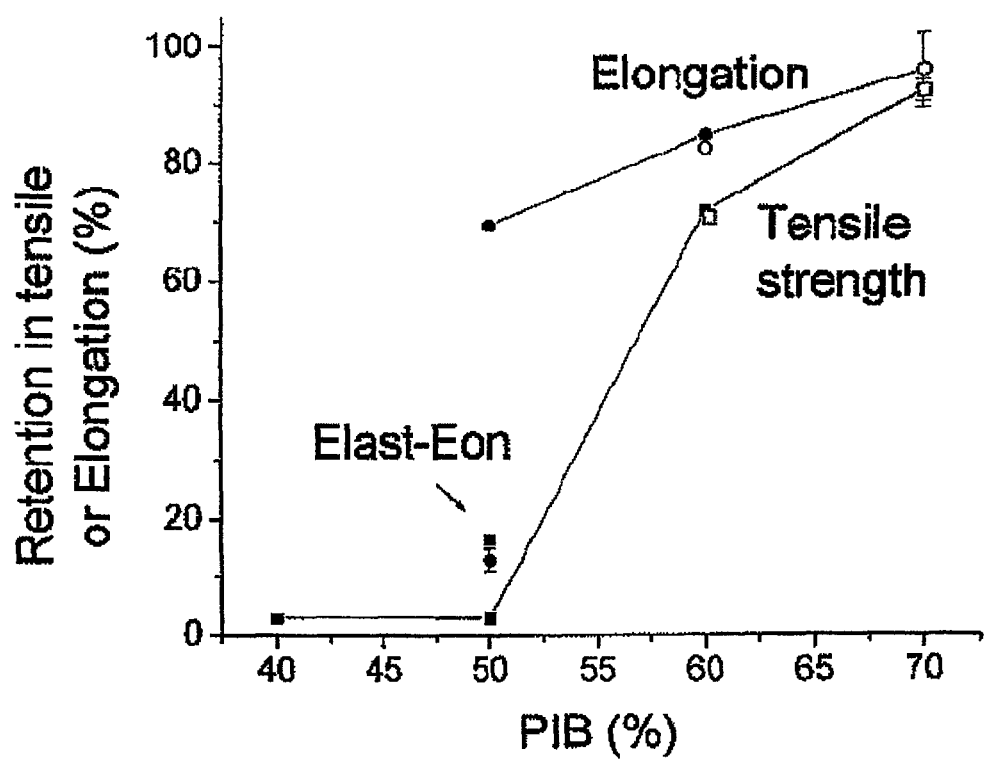
FIG. 9 is a graph illustrating retention of tensile strength and elongation of PIB- and PIB/PTMO-based polyurethanes as a function of PIB content (weight percent) before and after 35 percent aqueous nitric acid exposure for 4 hours—open symbols indicate polyurethanes containing only PIB as soft segments.

Turning to FIG. 9, the nature and molecular weight of the soft co-segments (i.e., PTMO or PC) and their relative proportion (e.g., the PIB/PTMO and PIB/PC ratio) are found to control mechanical properties and oxidative/hydrolytic stability of PUs. It is determined that oxidative/hydrolytic stability increases with the amount of PIB and, specifically, by incorporating up to about 70 weight percent (or even slightly higher) PIB soft segments into Pus one can obtain products with reasonably good mechanical properties (18 MPa tensile strength, 600 percent elongation) and outstanding oxidative-hydrolytic stability (resistant to 35 percent $HNO_3$). The incorporation of only 50 weight percent PIB in the PU yields improved mechanical properties (30 MPa tensile strength, 600 percent elongation). However, the comes at the expense of a lower oxidative-hydrolytic stability. The oxidative/hydrolytic resistance of PIB-based PUs is investigated by stirring samples of this material in 35 percent (aqueous) $HNO_3$ and assessing their extent of degradation by determining mechanical properties (tensile strength and elongation) before and after contact with the concentrated acid. The extent of degradation of PIB-based PUs is compared with the best grades of Carbothane and Elast-Eon (controls) exposed to the same experimental conditions. FIG. 9 shows the results. According to the data, PIB-based PU containing up to 70 weight percent, or even slightly higher, PIB survived the onslaught of this extremely aggressive oxidizing reagent and lost only an insignificant extent of tensile strength and elongation, whereas the controls completely degraded to discolored gooey viscous masses.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A PIB-based polymer composition comprising:
   (a) from about 55 weight percent to about 75 weight percent, based upon the total composition, of one or more soft segments, wherein at least 55 weight of the total composition is polyisobutylene (PIB);
   (b) from about 15 weight percent to about 40 weight percent of one or more hard segments; and
   (c) from about 2 weight percent to about 7.5 weight percent of one or more hydrogen bond acceptor chain extender (HACE) segments, wherein each hydrogen bond acceptor chain extender segment has a molecular weight of from about 125 g/mol to about 900 g/mol and is selected from the group consisting of the hydroxyl-terminated compounds of the following formula:

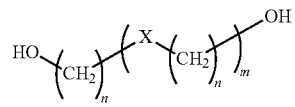

Where n is equal to an integer in the range of 1 to 6, m is equal to an integer in the range of 1 to 10, and where X is selected from:

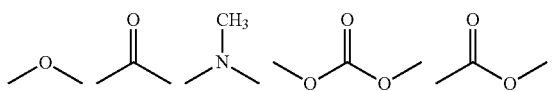

and

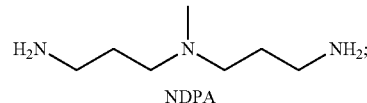

NDPA and wherein the above PIB-based polymer composition is made by the method comprising the steps of:
   (I) combining one or more amine telechelic PIBs, one or more hydroxyl telechelic PIBs, or a combination thereof with one or more diisocyanates to yield a mixture, wherein the amount of the one or more amine telechelic PIBs, one or more hydroxyl telechelic PIBs, or a combination thereof is selected so as to yield a PIB-based polymer having from about 55 weight percent to about 75 weight percent PIB-based segment in the polymer composition, wherein at least 55 weight of the total composition is polyisobutylene (PIB);
   (II) adding at least one catalyst to the mixture formed in Step (I) and reacting the mixture with the catalyst to yield a prepolymer;
   (III) adding one or more chain extenders and from about 2 weight percent to about 7.5 weight percent of one or more hydrogen bond acceptor chain extender (HACE) compounds to the prepolymer, wherein each hydrogen bond acceptor chain extender compound has a molecular weight of from about 125 g/mol to about 900 g/mol;
   (IV) reacting the mixture of the prepolymer, the one or more chain extenders and the one or more hydrogen bond acceptor chain extender (HACE) compounds to yield a PIB-based polymer; and
   (V) collecting the PIB-based polymer.

2. The polymer composition of claim 1, wherein the one or more soft segments is entirely PIB.

3. The polymer composition of claim 1, wherein the one or more hard segments include PU-based hard segments.

4. The polymer composition of claim 1, wherein component (a) is present in the range of from about 60 weight percent to about 70 weight percent in the polymer composition.

5. The polymer composition of claim 1, wherein component (b) is present in the range of from about 20 weight percent to about 35 weight percent in the polymer composition.

6. The polymer composition of claim 1, where the soft segments are formed from one or more amine telechelic PIBs, one or more hydroxyl telechelic PIBs, or a combination thereof, and wherein the one or more amine telechelic PIBs or one or more hydroxyl telechelic PIBs have from about 2 to about 5,000 PIB repeating units.

7. The polymer composition of claim 1, wherein component (b) is formed from the combination of one or more diisocyanates and one or more chain extenders, wherein the one or more diisocyanates are selected from 4,4'-methylene diphenyl diisocyanate and/or 4,4'-methylene dicyclohexyl diisocyanate, and wherein the one or more chain extenders are selected from 1,4-butane diol, 1,6-hexane diol and/or 1,6-hexane diamine.

8. The polymer composition of claim 1, wherein component (c) is formed from one or more hydrogen bond acceptor chain extenders selected from one or more esters, carbonates, ketones, and/or amines.

9. The polymer composition of claim 1, wherein component (c) is selected from one or more compounds according to the following formula:

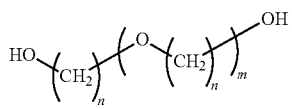

where n is equal to an integer in the range of 1 to 6, m is equal to an integer in the range of 1 to 10.

10. The polymer composition of claim 1, wherein component (c) is selected from one or more hydrogen bond acceptor chain extenders according to the formulas below:

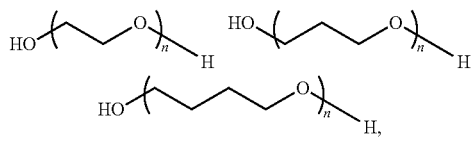

where the one or more hydrogen bond acceptor chain extenders compounds have a molecular weight of about 125 grams per mole to about 900 grams per mole.

11. The polymer composition of claim 1, wherein component (c) is selected from one or more hydrogen bond acceptor chain extenders according to the formulas below:

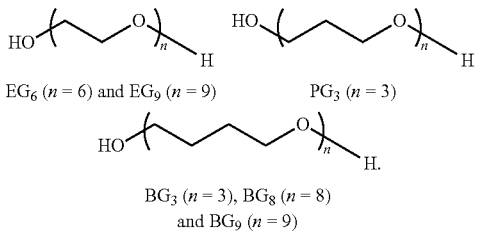

EG$_6$ ($n$ = 6) and EG$_9$ ($n$ = 9)   PG$_3$ ($n$ = 3)

BG$_3$ ($n$ = 3), BG$_8$ ($n$ = 8) and BG$_9$ ($n$ = 9)

* * * * *